(12) United States Patent
McKague, Jr. et al.

(10) Patent No.: US 6,520,706 B1
(45) Date of Patent: Feb. 18, 2003

(54) COMPOSITE MATERIAL SUPPORT STRUCTURES WITH SINUSOIDAL WEBS AND METHOD OF FABRICATING SAME

(75) Inventors: Elbert Lee McKague, Jr., Fort Worth, TX (US); Ronald Patrick Schmidt, Crowley, TX (US); David Thomas Uhl, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 114 days.

(21) Appl. No.: 09/648,488

(22) Filed: Aug. 25, 2000

(51) Int. Cl.[7] .......................... B64C 1/00; B29D 31/00; E04C 3/28
(52) U.S. Cl. .................. 403/265; 403/404; 428/57; 156/148; 156/182; 156/393
(58) Field of Search ................. 403/179, 265, 403/267, 266, 345, 384, 404, 410; 428/57, 43; 156/148, 174, 182, 264, 393

(56) References Cited

U.S. PATENT DOCUMENTS

| | | | |
|---|---|---|---|
| 4,734,146 A | | 3/1988 | Halcomb et al. |
| 4,782,864 A | | 11/1988 | Abildskov .............. 139/384 R |
| 5,476,704 A | | 12/1995 | Kohler |
| 5,556,565 A | * | 9/1996 | Kirkwood et al. .......... 219/633 |
| 5,783,279 A | | 7/1998 | Edgson et al. |
| 5,795,094 A | | 8/1998 | McKague, Jr. et al. ..... 403/335 |
| 5,829,716 A | * | 11/1998 | Kirkwood et al. ...... 244/117 R |

FOREIGN PATENT DOCUMENTS

DE  1956826 A  5/1971

OTHER PUBLICATIONS

Lestari, W. et al. *Development of a Trigger Mechanism to Reduce Peak Forces in Crash Loaded Composite Sine–Wave Spars*, European Rotorcraft Forum, Amsterdam, NL, Oct. 4, 1994, pp. 107–1–107–15.

* cited by examiner

Primary Examiner—Christopher J. Novosad
(74) Attorney, Agent, or Firm—Bracewell & Patterson, L.L.P.

(57) ABSTRACT

A support structure flange preform resembles the Greek letter "pi" and has a base with two legs extending therefrom. The preform is composed of a composite material that is formed from tows of woven or braided fiber. The tows are oriented to extend throughout each the base and legs. The preform may be either impregnated with a suitable thermoset resin, or may be unimpregnated so that resin may be infused at a later step of the overall manufacturing process. Two of the preforms are joined to a sine wave-shaped web of the structural beam. The web is formed from uncured, thermoset resin sheets that are reinforced with oriented fibers. The web has two outer laminates that sandwich a syntactic or foamed resin layer in between. The legs of each preform straddle one edge of the web and are shaped to both sides to the precise contours of the web. A laminate strip is positioned against the base of each preform to create a pair of flanges for the structural support member. The assembled structure is then heated and cured. The web and/or flanges of the structure also may be configured with alternating beads, tapered in either the vertical or horizontal direction, or inclined at non-orthogonal angles.

23 Claims, 6 Drawing Sheets

Fig. 15 form a preform resin may be infused at a later step of the overall manufac-

COMPOSITE MATERIAL SUPPORT STRUCTURES WITH SINUSOIDAL WEBS AND METHOD OF FABRICATING SAME

CROSS-REFERENCE TO RELATED APPLICATIONS

The following U.S. Patent Applications by the same first inventor, Elbert L. McKague, Jr. are being simultaneously filed and incorporated herein by reference:

U.S. Patent Application entitled "Apparatus And Method For Controlled Damage Of Conformable Materials"; U.S. Patent Application entitled "Apparatus And Method For Joining Dissimilar Materials To Form A Structural Support Member"; and U.S. Patent Application entitled "Composite Structural Panel with Undulated Body".

BACKGROUND OF THE INVENTION

1. Technical Field

The present invention relates in general to an improved structural support member, and in particular to an improved structural beam having a sinusoidal-shaped web. Still more particularly, the present invention relates to a structural support beam formed from composite materials and having a pair of end flanges joined by a sinusoidal-shaped web.

2. Description of the Prior Art

Structural support spars or I-beams typically have an "I" shaped cross-section with a vertically-oriented web and a crossbar or flange on each vertical end of the web. The web and flanges extend integrally down the length of the beam, but may vary in shape, thickness, etc. For example, a beam with a sinusoidal or sine wave-shaped web increases the apparent section thickness of the web. Beams with sinusoidal webs have been pursued through a variety of design and manufacturing approaches since these structures offer the potential of providing the best stiffness and strength-to-weight performance of any support structures.

Currently, all composite beams having sinusoidal webs utilize composite materials with fibers that extend continuously from the web into the flanges. The fibers are simply turned to the desired angle (90 degrees in beams having flanges that are perpendicular to the web) prior to curing resin in the beam. In essence, two "C" shaped sections are created and then joined back-to-back by co-curing the web area and the flange portions to outer cap laminates that laterally unite the two C-sections. Fabrication typically has involved a great deal of hand working of the composite material into the sine wave configuration. An especially labor-intensive step is required to properly turn the fibers at the corners where they transition from the curved to flat geometry between the web and flange portions of the beam. Many techniques have been used to create this configuration including lay-up and cure of previously impregnated ("prepreg") materials, and lay-up of dry fabric followed by resin transfer molding or other resin infusion methods. Because of the inherent manufacturing limitations of these techniques, fabric materials rather than unidirectional materials are usually required.

Achieving adequate stiffening of the web is another concern for structural spars. This problem has been addressed by increasing the composite laminate thickness of the web, or by using a flat web and attaching individual stiffening elements such as hats, blades, "J's", or "C's". Unfortunately, these two solutions significantly increase the weight of the spar and increase the cost of fabrication, respectively. Other designs incorporate flat, stiffened, structural panels instead of sine wave webs. These latter versions typically use honeycomb cores or similar materials between the two laminate faces of a web having the appropriate planar profile. The use of such stiffened flat webs is not as weight-efficient as sine wave webs.

SUMMARY OF THE INVENTION

A structural support beam flange preform resembles the Greek letter "pi," having a base with two legs extending therefrom. The preform is a composite material that is formed by weaving or braiding bundles or tows of fibers. The fibers are oriented to extend throughout each the base and legs. If used with a flat web, the preform can be woven or braided with a straight-line movement through the weaving or braiding machinery. If used with a sinusoidal web, it may be desirable to laterally deflect the axial or warp fibers back and forth to create a sinusoidal-shaped preform. Either way, the resulting preform may be either impregnated with a suitable thermoset resin, or may be unimpregnated so that resin may be infused at a later step of the overall manufacturing process.

Two of the preforms are joined to a sine wave-shaped web of the structural beam. The panel is formed from uncured, thermoset resin sheets that are reinforced with oriented fibers. The panel has two outer layers that sandwich two shorter layers on each end, and a syntactic or foamed resin layer in between. The legs of each preform straddle one edge of the panel and are shaped to both sides of the precise contours of the panel. A laminate strip is positioned against the base of each preform to create a pair of flanges for the structural support member. The assembled structure is then heated and cured. The web and/or flanges of the structure also may be configured with alternating beads, tapered in either the vertical or horizontal direction, or inclined at non-orthogonal angles. In addition, the structural support member may be formed as an I-beam, a C-beam, or a Z-beam.

The foregoing and other objects and advantages of the present invention will be apparent to those skilled in the art, in view of the following detailed description of the preferred embodiment of the present invention, taken in conjunction with the appended claims and the accompanying drawings.

DESCRIPTION OF THE DRAWINGS

So that the manner in which the features, advantages and objects of the invention will become apparent and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
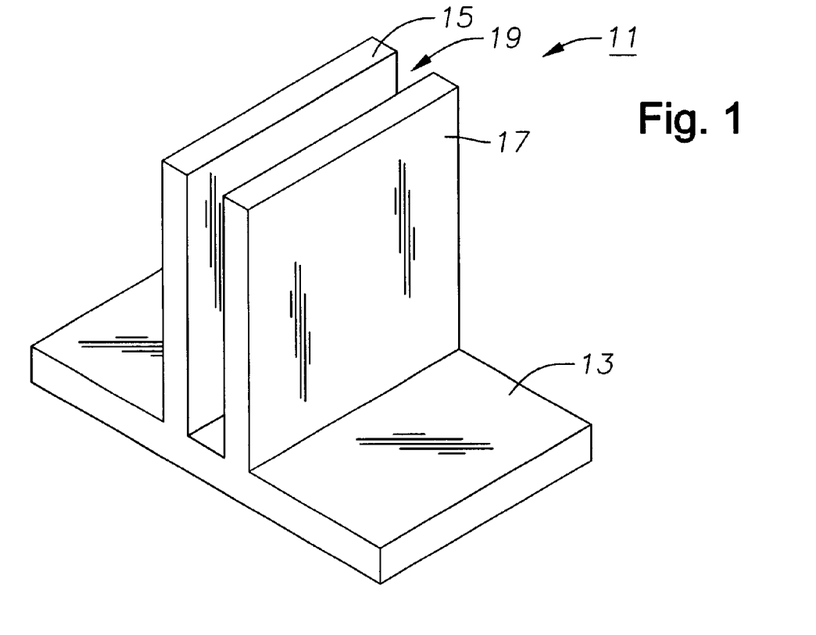
FIG. 1 is an isometric view of a short, straight pi-shaped structural support flange for a flat-webbed structural support beam constructed in accordance with the invention.
Figure 2:
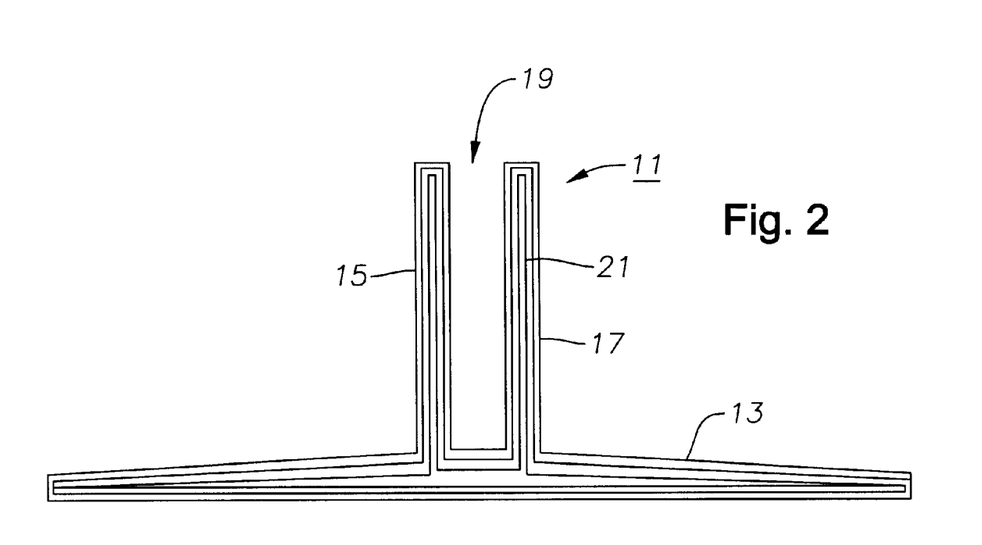
FIG. 2 is a sectional end view of the flange of FIG. 1 showing the path of transverse fibers going from one edge of the pi-shaped base up one leg, back down, over, and then up and down the second leg before going on the opposite end of the base.

Referring to FIGS. 1 and 2, a preformed component or "preform" 11 for a structural support beam is shown. When viewed from the end or in cross-section, preform 11 resembles the Greek letter π or "pi" having a longitudinal crossbar or base 13 with two longitudinal legs 15, 17 extending therefrom. A groove or channel 19 is defined between legs 15, 17. Preform 11 is a composite material that is formed by weaving or braiding bundles or tows of 15 fibers 21 (FIG. 2). The fibers 21 are oriented to extend continuously throughout each segment of preform 11 including base 13 and legs 15, 17. However, the fiber preforms may be formed to provide any desired fiber architecture needed to impart chosen load-carrying capability and to accommodate any desired web panel thickness. Preform 11 may be either impregnated with a suitable thermoset resin, or may be unimpregnated so that resin may be infused at a later step of the overall manufacturing process.

Figure 3:
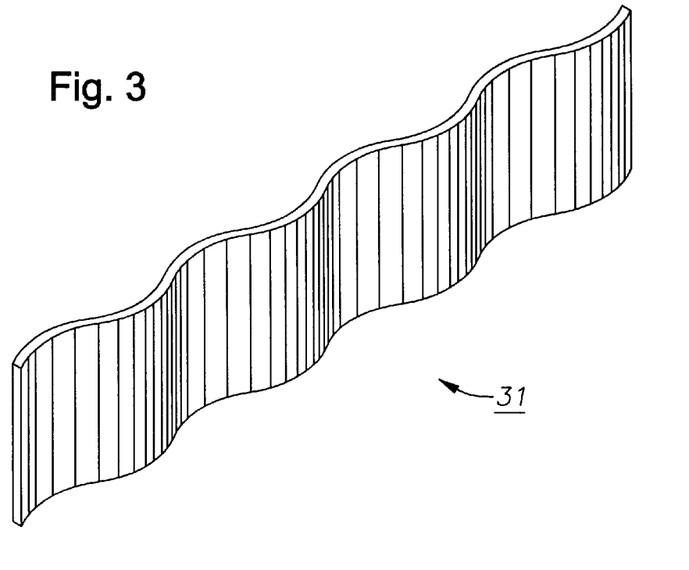
FIG. 3 is an isometric view of a sinusoidal web used in conjunction with a type of flange such as the one illustrated in FIG. 1.

A panel 31, such as shown in FIG. 3, having a generally undulating or sine wave configuration extending in the longitudinal direction is used as the web of a structural beam in conjunction with two preforms 11. Panel 31 is formed from uncured, thermoset resin sheets or plies that are reinforced with oriented fibers which are segmented to provide desired fiber lengths. The sheets are cut and stacked to form laminates of the composite material for panel 31. Each of the plies may vary in the direction orientation of their fibers. In the preferred embodiment, panel 31 has two outer laminates that sandwich a syntactic or foamed resin layer in between. Each of the composite laminates is formed from the same materials and by the same process.

The uncured panel 31 is assembled into a flat configuration that is heated and formed to the contours of a tool having an undulated profile or surface geometry. Panel 31 is then further heated to cure the combined composite and syntactic resins into a series of longitudinal undulations that typify each of its layers. In the embodiment shown, the undulations are in a smooth, sine wavelike pattern that allow panel 31 to maintain a generally planar configuration. Although the fibers themselves do not stretch, the short lengths of the fibers enable stretching of the material in the fiber direction by formation of small gaps between the fiber ends so that deformation of the composite is possible in all directions. Thus, panel 31 is stiffened both by spacing its outer layers apart with the syntactic layer, and by its undulated surface. The spacing apart of the outer layers of panel 31 helps achieve weight efficient stiffening against lengthwise bending in a direction that is perpendicular to the web face. The undulations in the web help provide weight efficient stiffening against bending or buckling loads in the beam's height direction. Length-wise bending loads having vectors parallel to the height direction are resisted by the flanges of the beam.

After curing, the edges of panel 31 may be machined as needed by an appropriate method to provide desired edge straightness, smoothness, and dimensional control. A more complete description of panel 31 is contained in U.S. patent application Ser. No. 09/645,728, and is incorporated herein by reference.

Figure 4:
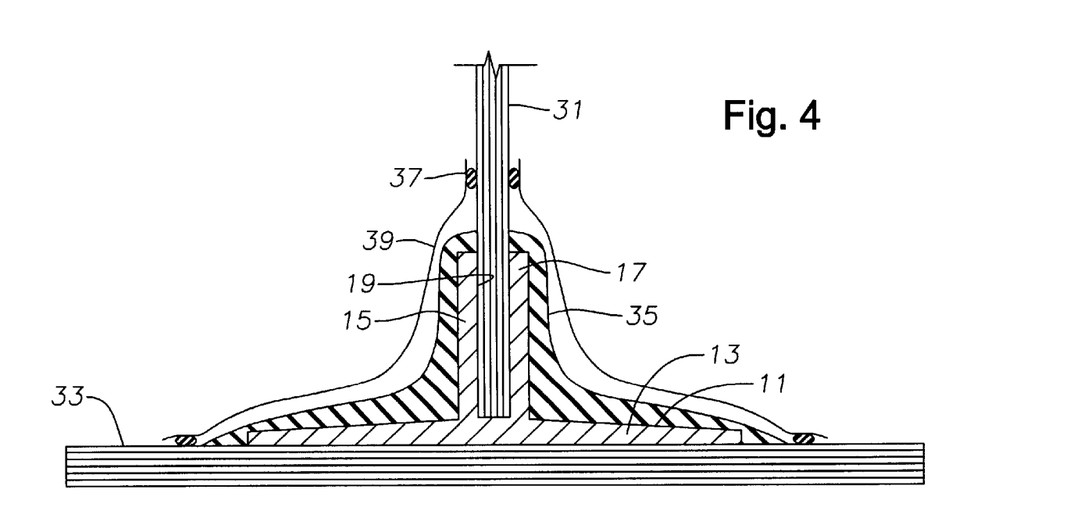
FIG. 4 is a schematic drawing during fabrication showing a sectional view of the web and flange of FIGS. 2 and 3, respectively, with a base cap or flange to be co-cured to that flange.

As illustrated in the simplified sectional drawing of FIG. 4, one of the edges of the sinusoidal panel 31 is fully inserted into channel 19 of preform 11 until it bottoms out as shown, or is acceptably close to bottoming out. The two legs 15, 17 straddle the overall thickness of panel 31 prior to being conformed to both sides of the precise contours of panel 31. Alternatively, a pre-conformed preform 11 may be matched to the undulated profile of the web/panel 31. The lateral or side edges of panel 31 are not attached to preforms 11. Next, a longitudinal, laminate strip 33 of appropriate thickness, ply, fiber orientation, and geometry is positioned against the base 13 of preform 11 opposite panel 31 to create a crossbar or flange for the future structural support member. Laminate strip 33 may be either cured or uncured, but the preferred embodiment of this invention is that it be already cured to provide the desired configuration and dimensional tolerances in order to simplify the assembly tooling that is required. In the embodiment of FIG. 4, laminate strip 33 is cured prior to assembly with preform 11. However, when laminate strip 33 is not cured prior to assembly with preform 11, then vacuum bag 39 is extended beyond the left and right side edges of laminate strip 33. In this latter case, the lower seals seal against a tool that supports the lower surface of laminate strip 33.

Figure 5:
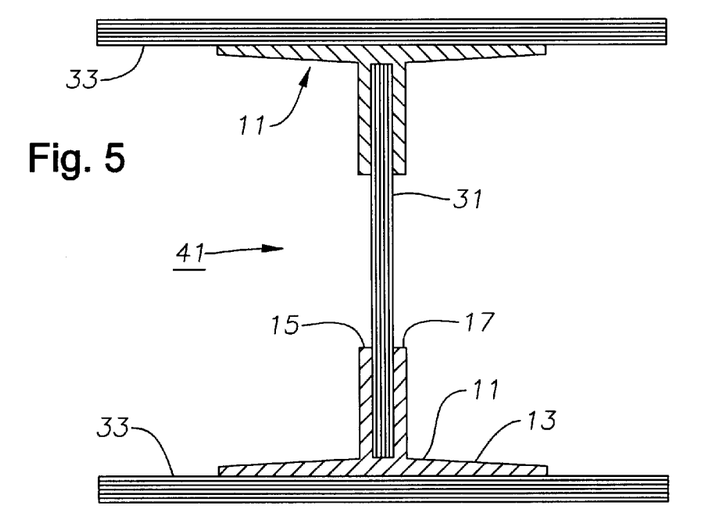
FIG. 5 is a sectional view taken at a point along the beam length corresponding with the neutral axis of a sinusoidal-webbed beam, or of a flat-webbed beam, and is constructed in accordance with the invention.

Appropriate boundary tooling is then positioned against each side of the pi-shaped preform 11, and, if the preform was previously unimpregnated, a selected resin is infused therein. In the embodiment shown, a conventional, molded silicone rubber pressure intensifier 35 is placed over preform 11 and sealed with sealant beads 37 inside a vacuum bag 39. The total structure is heated to cure the resin in preform 11, thereby creating structural bonds that integrally link preform 11 to the sine wave panel 31 to create a desired sine wave spar. Although the process was described for only one side of panel 31, this series of steps may be performed simultaneously on both sides of panel 31 to form the end product spar or beam 41 (FIGS. 5 and 6).

Figure 6A:
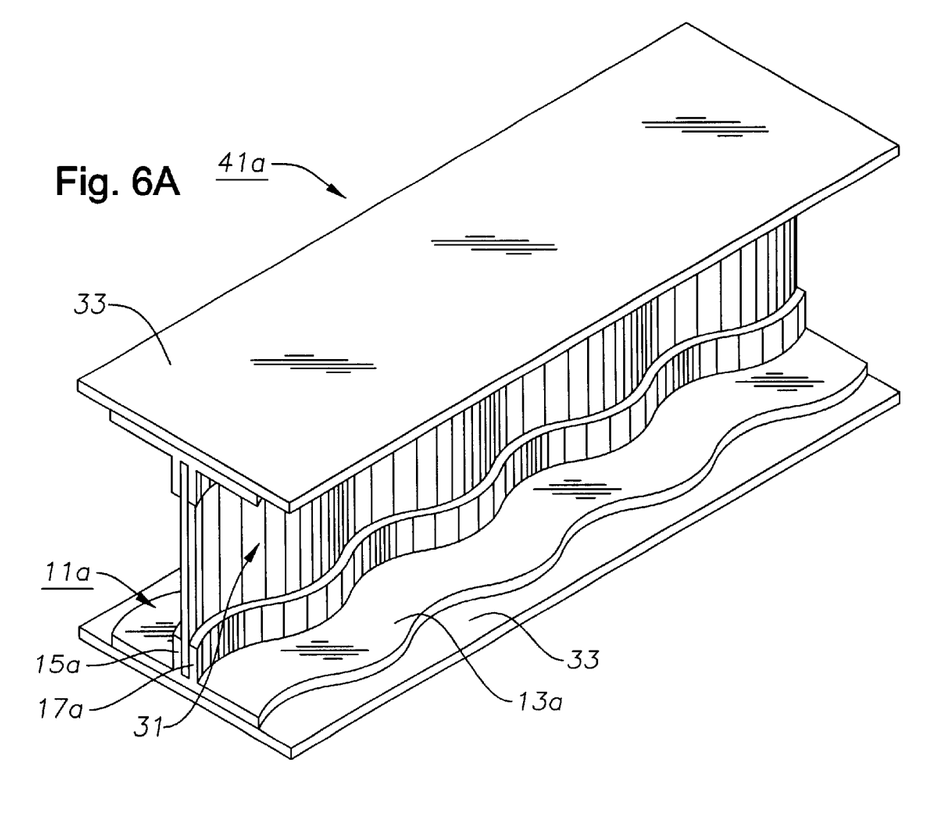
FIGS. 6A and 6B are isometric views of two versions of sinusoidal-webbed support beams of FIG. 5.

FIG. 6A represents a version of beam 41a having a preform 11a with rectilinear legs 15a, 17a that are conformed to the contours of web 31. Preform 11a is shown with undulating edges that match the contours of web 31.

This is due to preform 11a coming off the braiding loom with a constant width. When preform 11a is conformed to the shape of web 31, the base 13a must also conform. This means that the fibers are stretching apart at the convex points of the curve, and bunching together at the concave points of the curve.

Figure 6B:
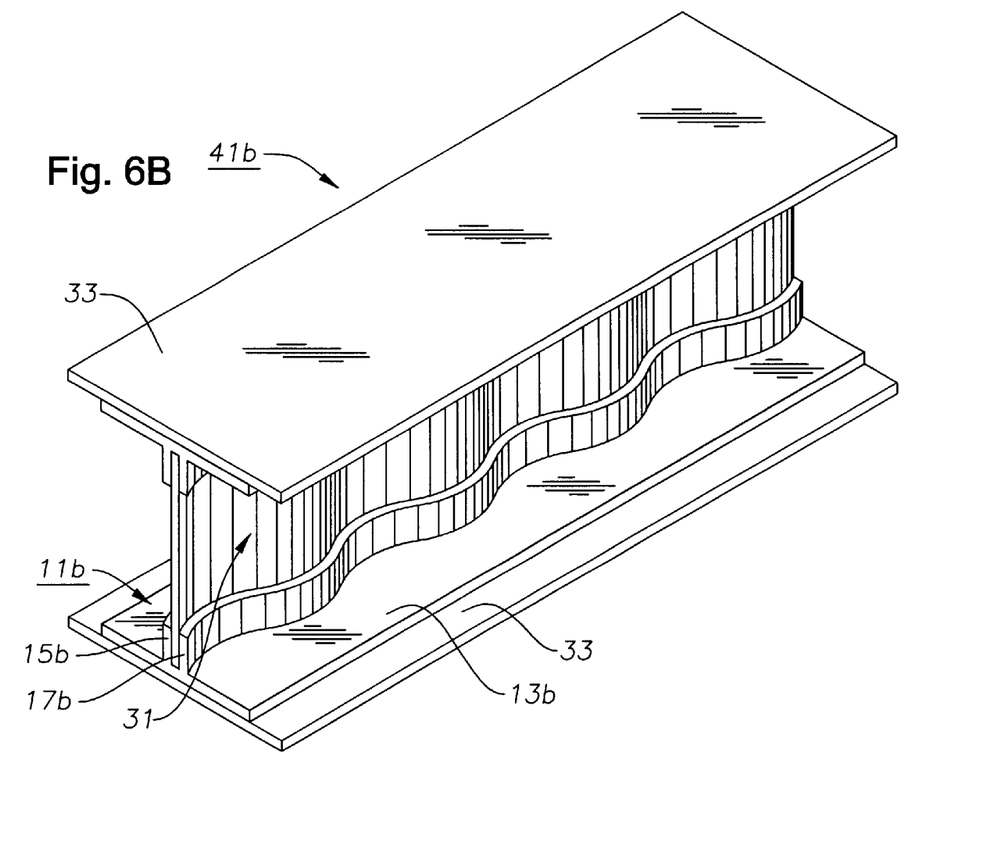

FIG. 6B represents a version of beam 41b having a preform 11b with curvilinear legs 15b, 17b that are preformed to the contours of web 31. The vertical lines representing legs 15b, 17b of preform 11b are spaced more uniformly instead of alternately spaced and bunched together as in FIG. 6A. In the version of FIG. 6B, the weaving or braiding operation is conducted such that the axial fibers are moved from side to side within the weaving or braiding machine so that preform 11b emerges having an inherent sine wave configuration. This is important for applications wherein the thicknesses of legs 15b, 17b and base 13b are large enough to make it difficult to bend a straight preform 11 into the sine wave shape.

It should be readily apparent to one skilled in the art that all of the materials may be uncured at the time of assembly of panel 31, preforms 11, and flange laminates 33. Although this reduces the number of cure cycles required, it significantly complicates the assembly cure tooling requirements, thereby increasing both cost and risk. It should also be readily apparent that panel 31 can be created as a solid, thicker laminate, without incorporation of the syntactic or foamed material described above. In addition, panel 31 can be shaped by laying continuous fiber prepreg material layer by layer to the contour of the forming tool, but such a process increases the probability of incurring higher manufacturing costs.

Figure 7:
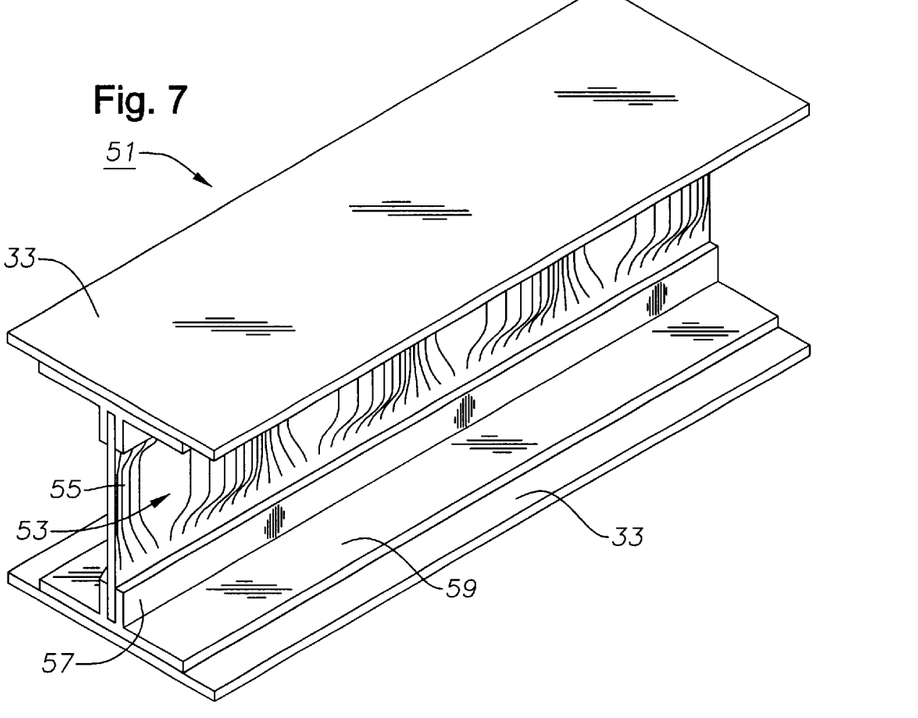
FIG. 7 is an isometric view of a second embodiment of the beam of FIG. 5, wherein interfaces of the web and the pi-shaped bases are straight, but where beads are formed out-of-plane from the web to provide stiffening.

Referring now to FIG. 7, a second embodiment of the invention is depicted as beam 51. Beam 51 has alternating undulations or beads 53 that are similar to the sine wave shape of beam 41, except that, in the preferred embodiment, beads 53 terminate into a flat edge at the top and bottom of web 55 prior to intersecting the legs 57 of preform 59. Thus, web 55 has substantially flat longitudinal edges extending along its length. However, beads 53 may extend all the way to the longitudinal edges of web 55.

Figure 8:
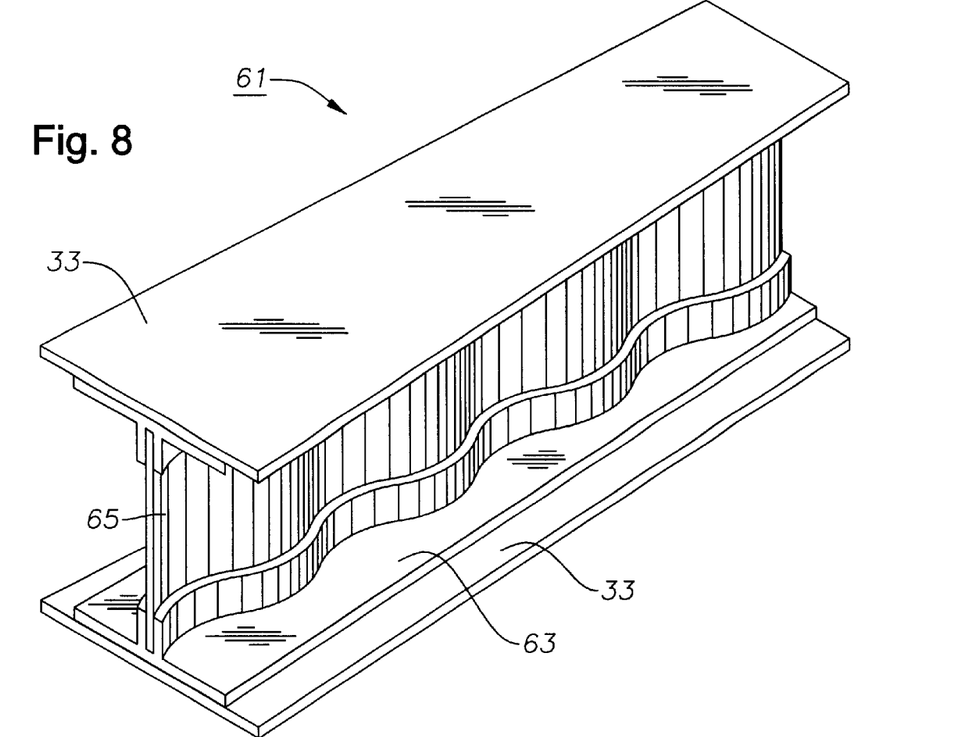
FIG. 8 is an isometric view of a third embodiment of the beam of FIG. 5, wherein the width of the flange caps tapers from one end of the beam to the other.
Figure 9:
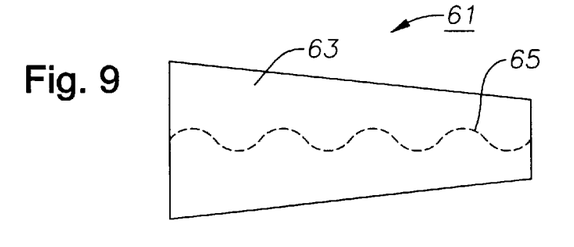
FIG. 9 is a top view of the beam of FIG. 8.
Figure 10:
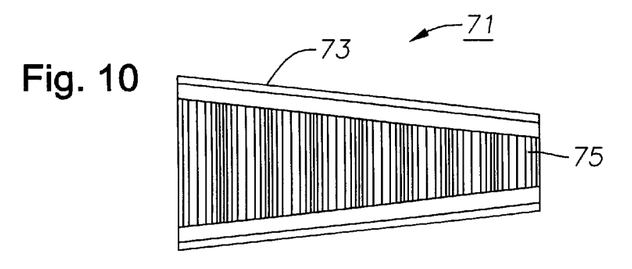
FIG. 10 is a side view of a fourth embodiment of the beam of FIG. 5, wherein the height of the web tapers from one end to the other end.
Figure 11:
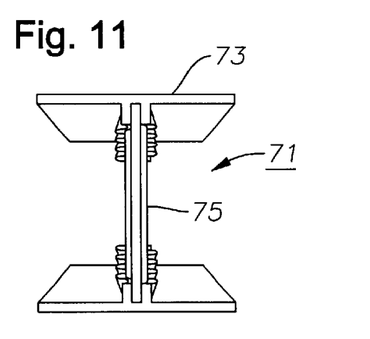
FIG. 11 is an end view of the beam of FIG. 10.

In third embodiment of the invention, FIGS. 8 and 9 depict a beam 61 with bases 63 that taper down in width from left to right along sinusoidal web 65. Thus, the width of bases 63 on one end (the left side) is smaller than the width of bases 63 on the other end (the right side). Likewise, the laminate flanges 33 taper in width. The fourth embodiment of FIGS. 10 and 11 is a beam 71 with flanges 73 that taper down in height from left to right along sinusoidal web 75. Thus, the height or vertical dimension of beam 71 on the left end is smaller than the height of beam 71 on the right end.

Figure 12:
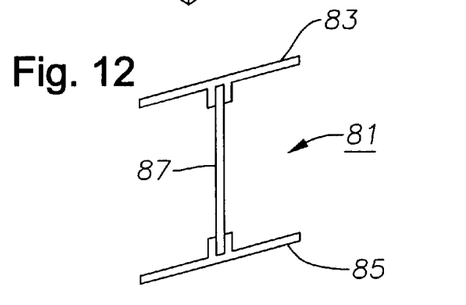
FIG. 12 is an end view of a fifth embodiment of the beam of FIG. 5, wherein the flanges are at non-orthogonal angles relative to the web.
Figure 13:
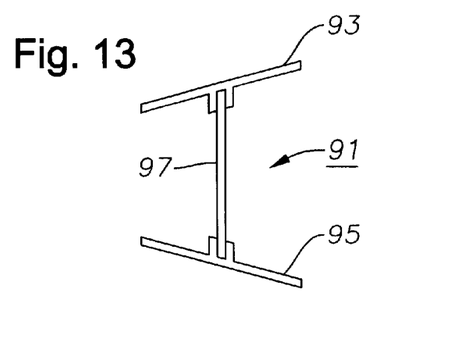
FIG. 13 is an end view of a sixth embodiment of the beam of FIG. 5.

In a fifth embodiment of the invention, FIG. 12 shows a beam 81 having upper and lower flanges 83, 85 that are inclined at a non-orthogonal angle relative to sinusoidal web 87. In the previous embodiments of the beams, the flanges were shown substantially perpendicular to their respective webs. However, in this version, flanges 83, 85 are tilted at the same acute angle relative to web 87 to fit a desired end use geometry. Similarly, in FIG. 13, a sixth embodiment of the invention illustrates a beam 91 having upper and lower flanges 93, 95 that inclined at opposite non-orthogonal angles relative to web 97.

Figure 14:
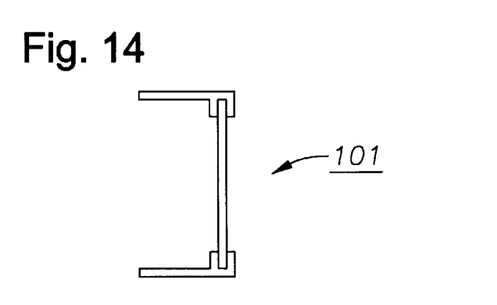
FIG. 14 is an end view of a seventh embodiment of the beam of FIG. 5.
Figure 15:
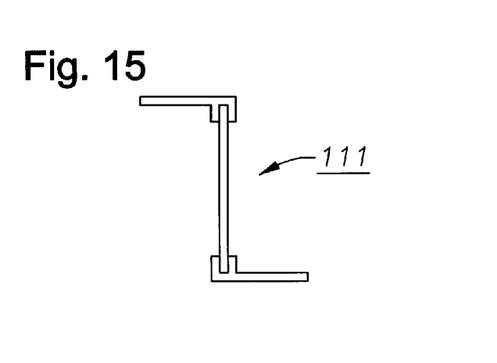
FIG. 15 is an end view of an eighth embodiment of the beam of FIG. 5.

The final two embodiments of the invention (FIGS. 14 10 and 15), illustrate that the concepts disclosed herein are not limited to I-beam type structural support members, but may be readily adapted for use in structures having other shapes as well. FIG. 14 shows a U-shaped or C-shaped structure 101, and FIG. 15 shows a Z-shaped structure 111. These embodiments are otherwise configured as described above for the previous embodiments.

The invention has several advantages. Using woven or braided pi-shaped preforms to unite the sine wave-shaped web and laminate flanges instead of relying on bending of continuous fibers eliminates the wrinkling and other quality-related problems of the prior art while simplifying and reducing the cost of manufacturing. In addition, using composite materials having a thermoset resin reinforced with fibers of selected or variable lengths enables the sine wave-stiffened structural spar to be laid to a simple, flat shape, and then formed to the sine wave shape. This process achieves the desired stiffness while reducing panel formation costs. Concurrent geometrical stiffening by spacing the load-carrying, composite face laminates apart with syntactic or foamed resin imparts an additional level of stiffness and strength at a lower weight and cost than by any other means. While the invention has been shown or described in only some of its forms, it should be apparent to those skilled in the art that it is not so limited, but is susceptible to various changes without departing from the scope of the invention.

What is claimed is:

1. A support structure, comprising:
 a laminated web formed from composite materials and having a longitudinal edge and an undulated profile extending in a longitudinal direction;
 a preform with a pi-shaped cross-section formed from composite materials, having a base oriented in a first direction with a pair of legs extending integrally from the base in a second direction that is substantially perpendicular to the first direction to define a channel therebetween, wherein the preform is formed from woven or braided tows of fiber that extend continuously through the base and both of the legs; and wherein
 the longitudinal edge of the web is mounted in the channel.

2. The support structure of claim 1, further comprising a laminate surface mounted to the base of the preform opposite the web.

3. The support structure of claim 1 wherein the undulated profile of the web has a sine wave configuration.

4. The support structure of claim 1 wherein the preform has a pi-shaped cross-section.

5. The support structure of claim 1 wherein the base of the preform is bonded to a flange.

6. A support structure, comprising:
 a laminated web formed from composite materials and having a longitudinal edge and an undulated profile extending in a longitudinal direction;
 a preform formed from composite materials, having a base with a pair of legs extending therefrom to define a channel therebetween, wherein the preform is formed from tows of fiber that extend continuously through the base and legs; wherein
 the longitudinal edge of the web is mounted in the channel; and wherein
 the web tapers in height in the longitudinal direction such that the structure is greater in height on one end than an opposite end.

7. A support structure, comprising:
 a laminated web formed from composite materials and having a longitudinal edge and an undulated profile extending in a longitudinal direction;
 a preform formed from composite materials, having a base with a pair of legs extending therefrom to define a channel therebetween, wherein the preform is formed from tows of fiber that extend continuously through the base and legs; wherein
 the longitudinal edge of the web is mounted in the channel; and wherein the base of the preform is inclined at a non-orthogonal angle relative to the web.

8. A structure, comprising:

a laminated web formed from composite materials and having a pair of straight longitudinal edges and an undulated profile with an alternating bead configuration extending in a longitudinal direction that is spaced apart from both of the straight longitudinal edges in a direction transverse to the longitudinal direction;

a generally pi-shaped composite preform having a base with a pair of legs extending therefrom to define a channel therebetween, wherein the preform is formed from tows of fiber that extend continuously through the base and legs;

a laminate member mounted to the base of the preform opposite the web; and wherein
the channel of the preform captures the longitudinal edge of the web such that the legs of the preform are free of contact with the undulated profile.

9. The structure of claim 8 wherein the laminate member comprises a flange.

10. The structure of claim 8 wherein the tows of fiber forming the preforms are woven.

11. The structure of claim 8 wherein the tows of fiber forming the preforms are braided.

12. A structure, comprising:

a laminated web formed from composite materials and having a pair of longitudinal edges, the web and a longitudinal edge having an undulated profile with contours extending in a longitudinal direction;

a generally pi-shaped composite preform having a base with a pair of legs extending therefrom to define a channel therebetween, wherein the preform is formed from tows of fiber that extend continuously through the base and legs;

a laminate member mounted to the base of the preform opposite the web; wherein
the channel of the preform captures the longitudinal edge of the web such that the legs of the preform are shaped to the contours of the undulated profile of the longitudinal edge; and wherein
the web tapers in the longitudinal direction such that the structure is greater in height on one end than an opposite end.

13. A structure, comprising:

a laminated web formed from composite materials and having a pair of longitudinal edges, the web and a longitudinal edge having an undulated profile with contours extending in a longitudinal direction;

a generally pi-shaped composite preform having a base with a pair of legs extending therefrom to define a channel therebetween, wherein the preform is formed from tows of fiber that extend continuously through the base and legs;

a laminate member mounted to the base of the preform opposite the web; wherein
the channel of the preform captures the longitudinal edge of the web such that the legs of the preform are shaped to the contours of the undulated profile of the longitudinal edge; and wherein
the laminate member is inclined at a non-orthogonal angle relative to the web.

14. A method for fabricating a support structure, comprising the steps of:

(a) providing a laminated web formed from composite materials and having a longitudinal edge and an undulated profile extending in a longitudinal direction;

(b) forming a preform from composite materials, the preform having a base with a pair of legs extending integrally therefrom to define a channel therebetween, wherein the preform has woven or braided tows of fiber that extend continuously through the base and legs in a resinous matrix;

(c) mounting the longitudinal edge of the web in the channel of the preform such that the legs of the preform straddle the longitudinal edge of the web; and (d) shaping the legs of the preform to the longitudinal edge of the web to form a support structure.

15. The method of claim 14 wherein step (b) comprises forming the preform with braided tows of fiber.

16. The method of claim 14, further comprising the step of impregnating the preform with a thermoset resin prior to step (b).

17. The method of claim 14 wherein the preform of step (b) is unimpregnated, and further comprising the step of infusing the unimpregnated preform with resin.

18. The method of claim 14, further comprising the step of mounting the base of the preform opposite the web to a laminate member.

19. The method of claim 14, further comprising the step of positioning boundary tooling on the preform and web after step (d) and heating the support structure.

20. The method of claim 14, further comprising placing a sealed pressure intensifier over the preform inside a vacuum bag after step (d).

21. The method of claim 14, further comprising the step of bonding a composite flange to the base on a side of the base opposite the channel.

22. A method for fabricating a support structure, comprising the steps of:

(a) providing a laminated web formed from composite materials and having a longitudinal edge and an undulated profile extending in a longitudinal direction;

(b) forming a preform from composite materials, the preform having a base with a pair of legs extending therefrom to define a channel therebetween, wherein the preform has tows of fiber that extend continuously through the base and legs in a resinous matrix;

(c) mounting the longitudinal edge of the web in the channel of the preform such that the legs of the preform straddle the longitudinal edge of the web;

(d) shaping the legs of the preform to the longitudinal edge of the web to form a support structure; and (e) tapering the web in a longitudinal direction such that the beam is greater in height on one end than an opposite end.

23. A method for fabricating a support structure, comprising the steps of:

(a) providing a laminated web formed from composite materials and having a longitudinal edge and an undulated profile extending in a longitudinal direction;

(b) forming a preform from composite materials, the preform having a base with a pair of legs extending therefrom to define a channel therebetween, wherein the preform has tows of fiber that extend continuously through the base and legs in a resinous matrix;

(c) mounting the longitudinal edge of the web in the channel of the preform such that the legs of the preform straddle the longitudinal edge of the web;

(d) shaping the legs of the preform to the longitudinal edge of the web to form a support structure; and (e) inclining the base of the preform at a non-orthogonal angle relative to the web.

* * * * *